US012747979B2

(12) United States Patent
Kvistgaard

(10) Patent No.: US 12,747,979 B2
(45) Date of Patent: Sep. 29, 2026

(54) TOP MODULE COMPRISING WEIGHING DEVICE AND METHOD FOR WEIGHING AN OBJECT PLACED ON A TOP MODULE

(71) Applicant: Nord Modules A/S, Odense S (DK)

(72) Inventor: Kristian Kvistgaard, Ringe (DK)

(73) Assignee: Nord Modules A/S, Odense S (DK)

( * ) Notice: Subject to any disclaimer, the term of this patent is extended or adjusted under 35 U.S.C. 154(b) by 296 days.

(21) Appl. No.: 18/636,480

(22) Filed: Apr. 16, 2024

(65) Prior Publication Data

US 2024/0353252 A1 Oct. 24, 2024

(30) Foreign Application Priority Data

Apr. 21, 2023 (DK) ........................... PA 2023 00342

(51) Int. Cl.

| | |
|---|---|
| ***G01G 19/08*** | (2006.01) |
| ***B25J 5/00*** | (2006.01) |
| ***B25J 13/08*** | (2006.01) |
| ***G01G 19/52*** | (2006.01) |
| ***G01G 21/23*** | (2006.01) |
| ***G06Q 10/08*** | (2024.01) |
| ***G06Q 10/087*** | (2023.01) |

(52) U.S. Cl.
CPC .............. *G01G 19/52* (2013.01); *B25J 5/007* (2013.01); *B25J 13/085* (2013.01); *G01G 19/083* (2013.01); *G01G 21/23* (2013.01); *G06Q 10/087* (2013.01)

(58) Field of Classification Search
CPC ........ G01G 3/12; G01G 19/083; G01G 19/12; G01G 19/52; G01G 21/23; G01G 21/28; B25J 5/005; B25J 5/007; B25J 13/085; G06Q 10/087
See application file for complete search history.

(56) References Cited

U.S. PATENT DOCUMENTS

| | | | | |
|---|---|---|---|---|
| 8,076,596 | B2 * | 12/2011 | Burkart | G01G 21/28 439/246 |
| 9,347,821 | B1 * | 5/2016 | Mullaney | G01G 19/62 |
| 9,486,923 | B2 * | 11/2016 | Plachetka | B25J 5/007 |
| 11,267,498 | B2 * | 3/2022 | Tolson | B62B 3/104 |
| 11,733,086 | B2 * | 8/2023 | Yoshinaga | G01G 23/37 177/136 |
| 12,306,033 | B2 * | 5/2025 | Ttraverso | B65G 1/137 |
| 2015/0153218 | A1 * | 6/2015 | Savage | G01G 21/23 177/253 |
| 2016/0236867 | A1 * | 8/2016 | Brazeau | B25J 5/007 |
| 2016/0356640 | A1 * | 12/2016 | Freeman | G08B 21/182 |
| 2017/0364073 | A1 | 12/2017 | Guy | |
| 2020/0200620 | A1 | 6/2020 | Fritsch et al. | |

(Continued)

FOREIGN PATENT DOCUMENTS

| | | |
|---|---|---|
| CN | 111942097 A | 11/2020 |
| DE | 102012101033 | 7/2013 |

(Continued)

*Primary Examiner* — Randy W Gibson
(74) *Attorney, Agent, or Firm* — Elevated IP, LLC

(57) ABSTRACT

A top module configured to be placed on and attached to a mobile robot is disclosed. The top module comprises attachment structures for attaching the top module to the mobile robot. The top module comprises an integrated weighing device configured to detect the weight of an object arranged on the top module.

16 Claims, 8 Drawing Sheets

(56) References Cited

U.S. PATENT DOCUMENTS

| | | | | |
|---|---|---|---|---|
| 2021/0239511 | A1* | 8/2021 | Yoshinaga | B65G 1/1375 |
| 2022/0026261 | A1* | 1/2022 | Funnell | G01G 21/23 |
| 2024/0353252 | A1* | 10/2024 | Kvistgaard | G01G 19/12 |
| 2026/0034680 | A1* | 2/2026 | Lee | B25J 11/008 |

FOREIGN PATENT DOCUMENTS

| | | | |
|---|---|---|---|
| EP | 3712102 | A1 | 9/2020 |
| EP | 3771955 | A1 | 2/2021 |
| JP | H07234150 | A | 9/1995 |

* cited by examiner

Fig. 1A
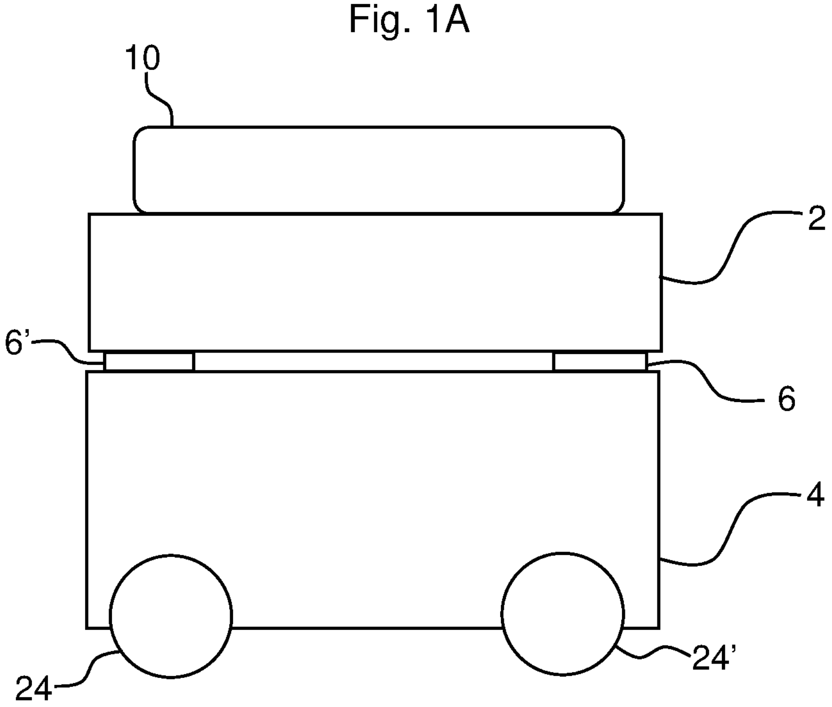
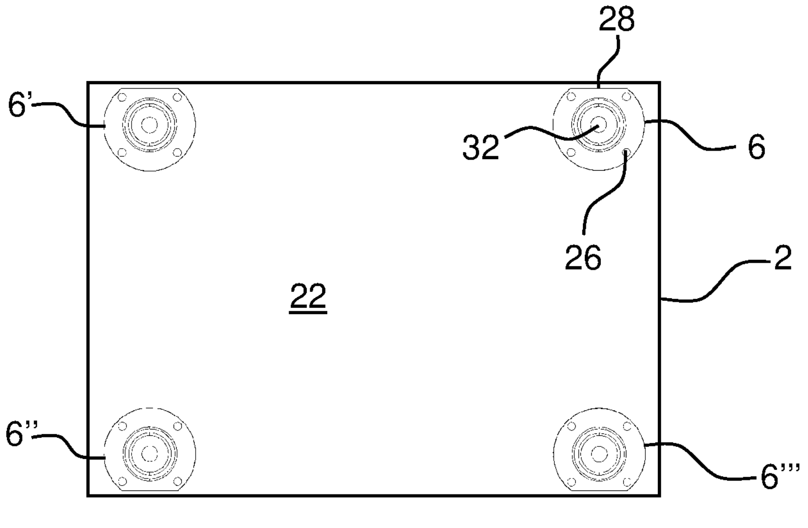
Fig. 1B

Fig. 2A
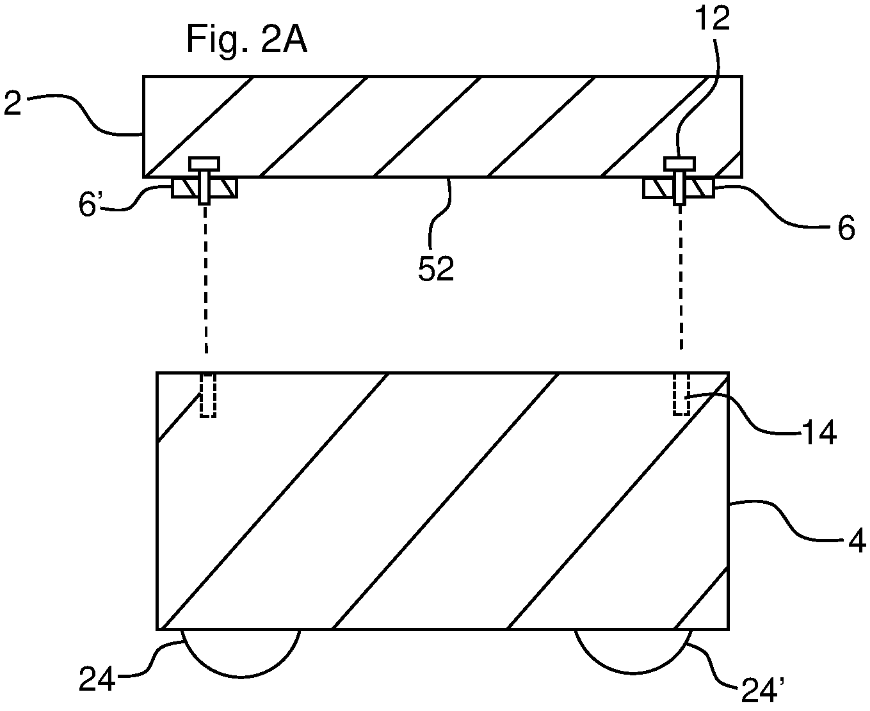
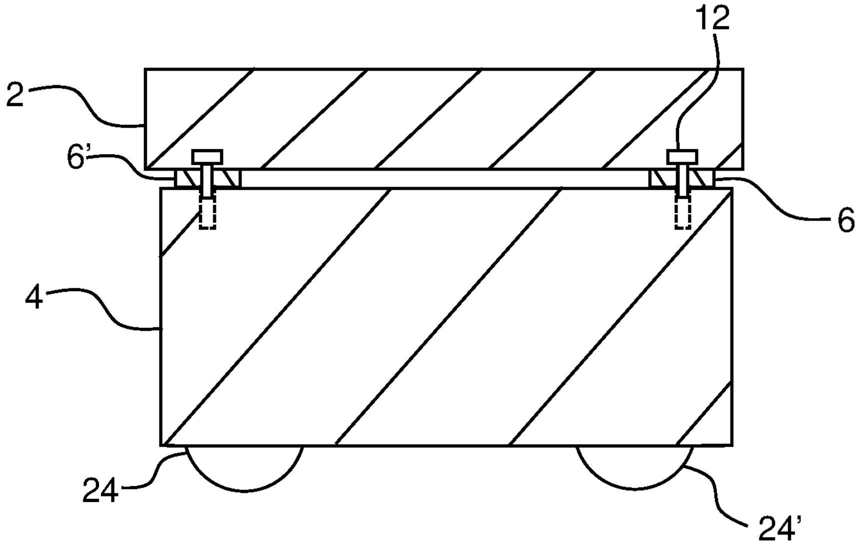
Fig. 2B

Fig. 3A
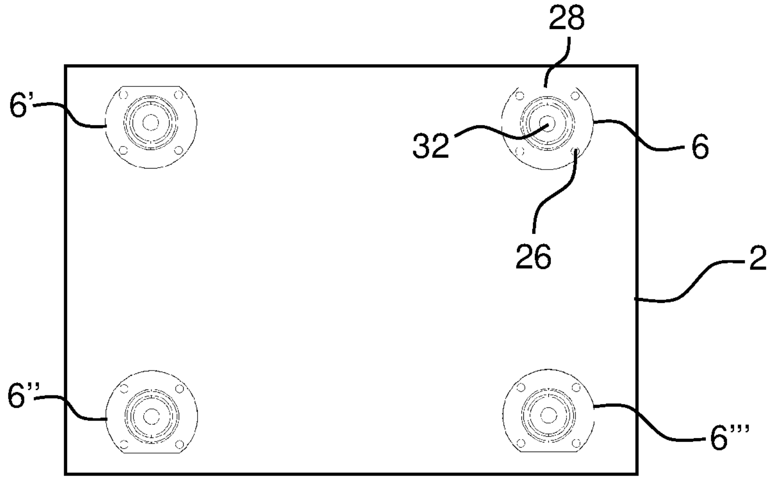
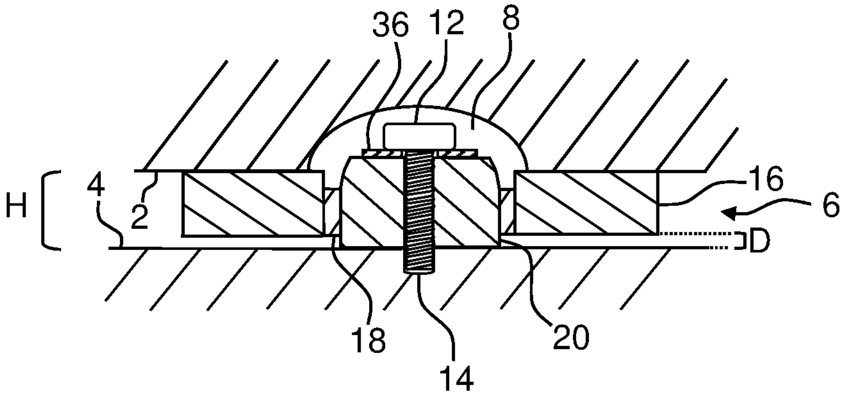
Fig. 3B

Fig. 4A
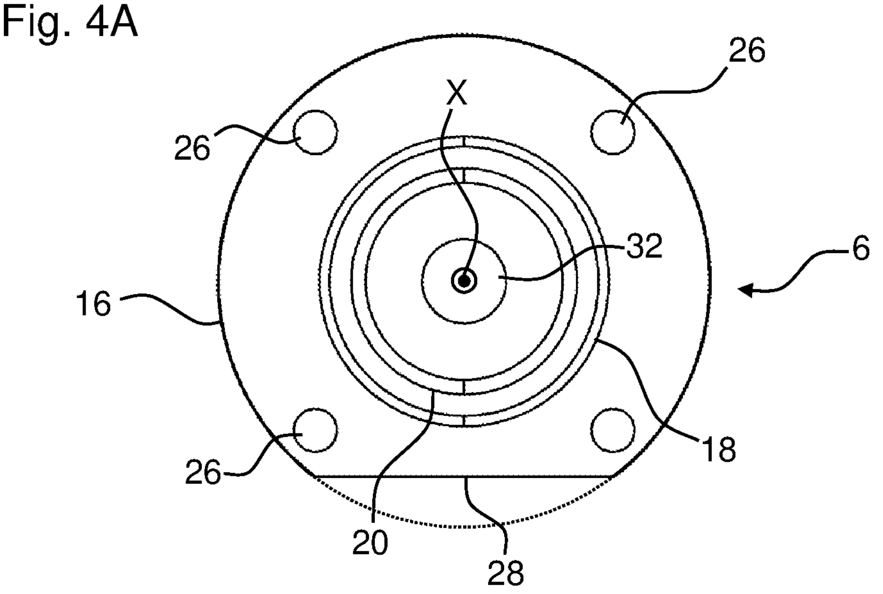
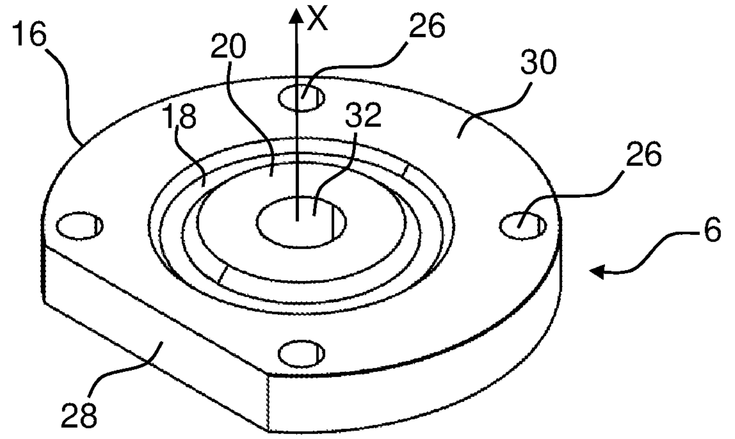
Fig. 4B
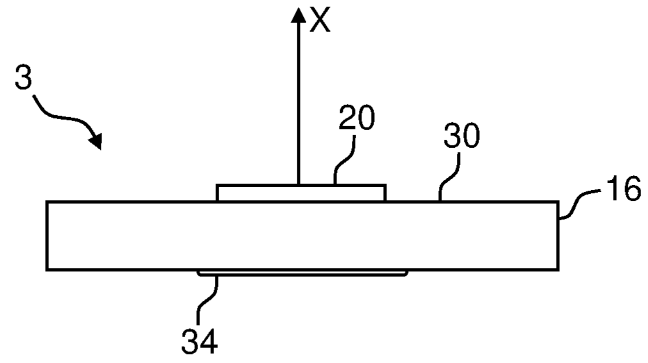
Fig. 4C

Fig. 6A
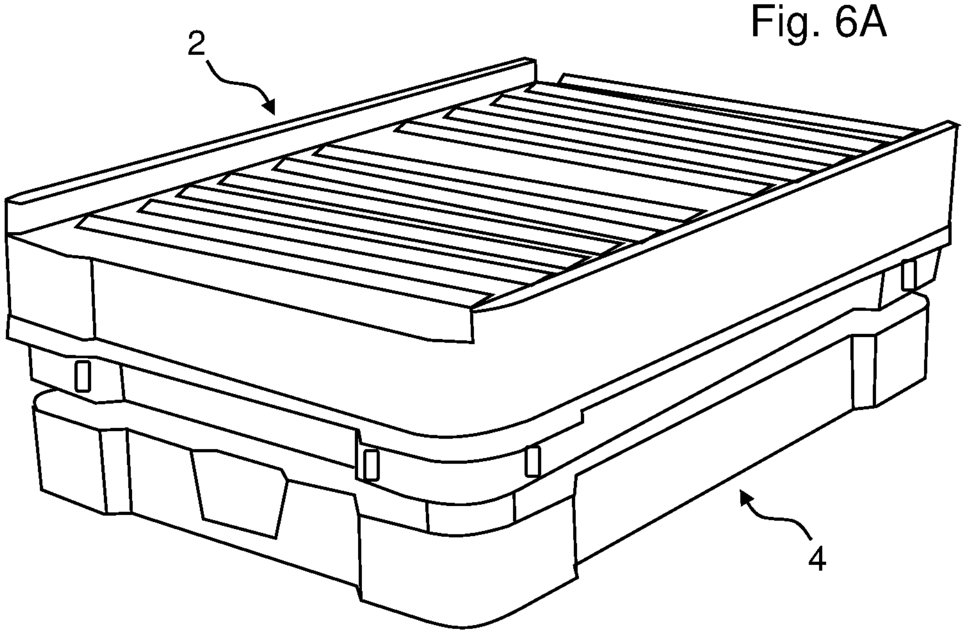
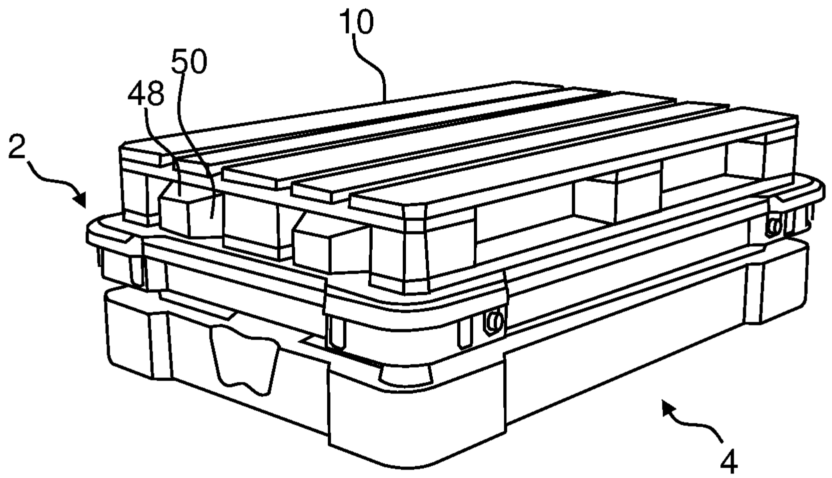
Fig. 6B

Fig. 7A
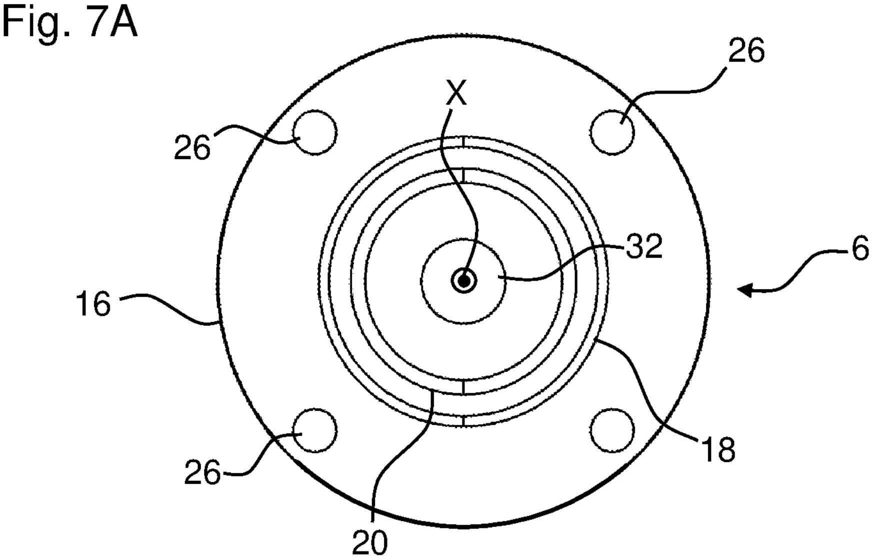
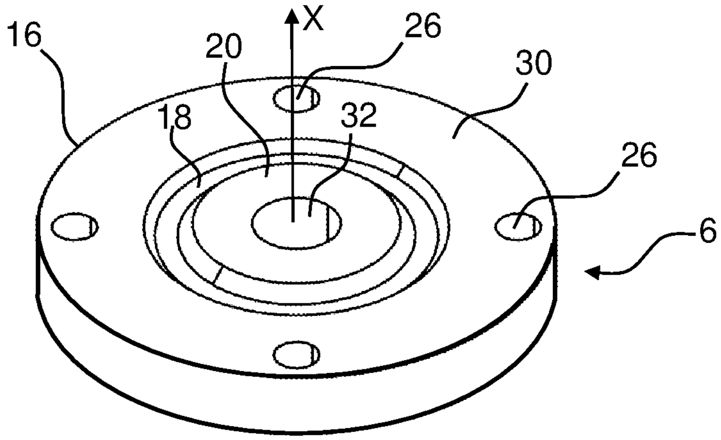
Fig. 7B
Fig. 7C
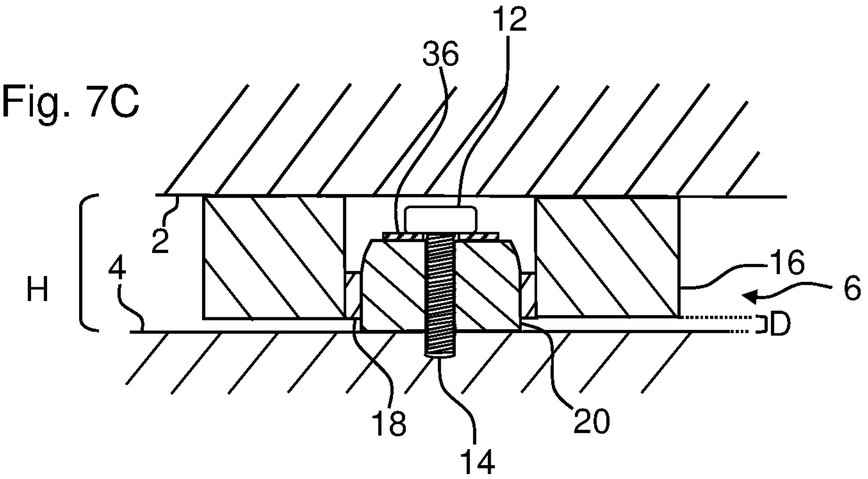

TOP MODULE COMPRISING WEIGHING DEVICE AND METHOD FOR WEIGHING AN OBJECT PLACED ON A TOP MODULE

CROSS-REFERENCE TO RELATED APPLICATIONS

This application claims the benefit of and priority to Danish Application No. PA 2023 00342, filed Apr. 21, 2023, which is hereby incorporated by reference in its entirety.

FIELD OF INVENTION

The present invention relates to a top module for a mobile robot.

The present invention also relates to a method for weighing an object placed on a top module.

BACKGROUND

Top modules are designed for being used together with mobile robots in order to increase the areas of use. Some top modules are referred to as lift modules. This kind of module is constructed to elevate objects resting on the top plate of the top module.

Different kinds of top modules are known. CN111942097 A1 discloses a mobile robot, comprising a chassis, a weighing assembly and a suspension assembly. The weighing assembly is arranged above the chassis, and two suspension assemblies are respectively arranged on both sides of the chassis. The mobile robot is, however, complex and requires reinforced structures to avoid a load provided close to a side portion tilting the top plate.

EP3771955 A1 discloses an autonomous mobile robot (AMR) and a method for operating an AMR. The AMR comprises a plurality of strain gauges that are provided on the AMR. The AMR is expensive and complex to manufacture, it would be desirable to have an alternative approach for weighing objects carried by an AMR.

U.S. Pat. No. 20,173,64073 A1 discloses a method of transporting a load to a deposit destination by a first robot having a first motive mechanism, and a second robot having a second motive mechanism that is independently operable from the first motive mechanism. The method comprising the first robot receiving a first instruction to satisfy an objective of transporting the load to the destination and working to accomplish the objective without acting upon any subsequent instruction as to how to transport the load to the destination. It would be desirable to have an alternative approach for weighing objects carried by a mobile robot.

Other types of mobile robots having integrated weighing devices are known. These solutions are, however, only possible to use in a limited amount of specific tasks.

Accordingly, it would be an advantage to have a solution that can be used in a task-independent manner.

Thus, there is a need for an alternative solution that reduces or even eliminates the above-mentioned disadvantages of the prior art.

BRIEF DESCRIPTION

A top module according to an embodiment is a top module configured to be placed on, mechanically attached to, and electronically connected to a mobile robot. The top module comprises attachment structures for attaching the top module to the mobile robot, and the top module comprises an integrated weighing device configured to detect the weight of an object arranged on the top module.

Hereby, it is possible to detect and use the weight as a parameter required to carry out additional steps. It is possible to transport objects in different patterns depending on the total load of the top module or to take specific actions on the basis of the detected weight.

The top module according to an embodiment is a top module configured to be placed on, mechanically attached to, and electronically connected to a mobile robot. In an embodiment, the mobile robot is an automatic guided vehicle (AGV), e.g., an unmanned guided vehicle that moves throughout a facility by following a set of predetermined paths.

In an embodiment, the mobile robot is an autonomous mobile robot (AMR) that collaborates in material handling tasks with humans.

The top module comprises attachment structures for attaching the top module to the mobile robot. In an embodiment, the top module comprises attachment structures formed as threaded holes configured to receive a bolt, screw or threaded rod.

The top module comprises an integrated weighing device configured to detect the weight of an object arranged on the top module. By the term "integrated" is meant mechanically attached to. The integrated weighing device would typically also be electrically connected to the top module.

In an embodiment, the weighing device comprises a plurality of spaced apart weighing units.

In an embodiment, the weighing device comprises two spaced apart weighing units.

In an embodiment, the weighing device comprises three spaced apart weighing units.

In an embodiment, the weighing device comprises four spaced apart weighing units.

In an embodiment, the weighing device comprises six spaced apart weighing units.

In an embodiment, the weighing device comprises eight spaced apart weighing units.

In an embodiment, the weighing device comprises more than eight spaced apart weighing units.

In an embodiment, the top module comprises a rectangular bottom plate.

In an embodiment, the top module is configured to be detachably attached to a mobile robot.

In an embodiment, the top module is configured to be detachably attached to several types of mobile robots.

In an embodiment, the top module comprises a rectangular bottom plate, wherein a weighing unit is arranged in each corner portion of the bottom plate.

In an embodiment, the top module comprises a rectangular bottom plate, wherein one or more weighing units are arranged in a central area of the bottom plate.

In an embodiment, each weighing unit comprises a strain gauge arranged in a mounting structure in such a manner that upon loading the top module, the strain gauge can be displaced relative to the mobile robot.

In an embodiment, each weighing unit comprises a strain gauge arranged in a mounting structure in such a manner that upon loading the top module, a portion of the strain gauge can be displaced towards the mobile robot.

In an embodiment, the height difference between the top module with an integrated weighing device and the top module without an integrated weighing device is less than 4 cm.

In an embodiment, the height difference between the top module with an integrated weighing device and the top module without an integrated weighing device is less than 3 cm.

In an embodiment, the height difference between the top module with an integrated weighing device and the top module without an integrated weighing device is less than 2 cm.

In an embodiment, the height difference between the top module with an integrated weighing device and the top module without an integrated weighing device is less than 1 cm.

In an embodiment, the height difference between the top module with an integrated weighing device and the top module without an integrated weighing device is less than 0.5 cm.

In an embodiment, the weighing units are attached by attachment structures.

In an embodiment, the weighing units are attached by attachment structures formed as screws, bolts or threaded rods.

In an embodiment, each weighing unit comprises a fixed portion that is fixed to the mobile robot by a screw member extending through a throughbore provided in the fixed portion.

In an embodiment, each weighing unit comprises a fixed portion that is fixed to the mobile robot by a screw member extending through a throughbore provided in the fixed portion, wherein each weighing unit comprises a slidably mounted portion that is mounted a non-zero distance above the mobile robot.

In an embodiment, a resilient member is provided between the fixed portion and the slidably mounted portion.

In an embodiment, a flexible member is provided between the fixed portion and the slidably mounted portion.

In an embodiment, each weighing unit comprises an elastic deformably mounted portion that is mounted a non-zero distance above the mobile robot.

In an embodiment, a resilient member is provided between the fixed portion and the elastic deformably mounted portion.

In an embodiment, a flexible member is provided between the fixed portion and the elastic deformably mounted portion.

The robot system according to an embodiment is a robot system comprising a mobile robot and a top module according to the present disclosure.

A method according to an embodiment is a method for weighing an object placed on a top module that is placed on and attached to a mobile robot, wherein said top module comprises one or more attachment structures for attaching the top module to the mobile robot, wherein the method comprises:

- arranging the object on the top module; and
- applying an integrated weighing device to detect the weight of the object.

In an embodiment, the weighing device comprises a plurality of spaced apart weighing units.

In an embodiment, the top module comprises a rectangular bottom plate, wherein a weighing unit is arranged in each corner portion of the bottom plate.

In an embodiment, each weighing unit comprises a strain gauge arranged with a mounting structure in such a manner that upon loading the top module, the strain gauge can be displaced relative to the mobile robot.

In an embodiment, the height difference between the top module with an integrated weighing device and the top module without an integrated weighing device is less than 2 cm.

In an embodiment, the weighing units are attached to the top module by attachment structures.

In an embodiment, the weighing units are attached to the top module by attachment structures shaped as screws, bolts or threaded rods.

In an embodiment, each weighing unit comprises a fixed portion that is fixed to the mobile robot by a screw member extending through a throughbore provided in the fixed portion, wherein each weighing unit comprises a slidably mounted portion mounted a non-zero distance above the mobile robot.

In an embodiment, a resilient member is provided between the fixed portion and the slidably mounted portion.

In an embodiment, a flexible member is provided between the fixed portion and the slidably mounted portion.

BRIEF DESCRIPTION OF THE DRAWINGS

Top modules and methods will become more fully understood from the detailed description given herein below. The accompanying drawings are given by way of illustration only, and thus, they are not limitative of the present inventions. In the accompanying drawings:

FIG. 1A shows a side view of a top module according to an embodiment mounted on a mobile robot;

FIG. 1B shows a bottom view of the top module shown in FIG. 1A;

FIG. 2A shows a schematic cross-sectional view of a top module according to an embodiment arranged above a mobile robot;

FIG. 2B shows a schematic cross-sectional view of a top module according to an embodiment attached to a mobile robot;

FIG. 3A shows a bottom view of a top module according to an embodiment;

FIG. 3B shows a cross-sectional close-up view of a weighing device of a top module according to an embodiment;

FIG. 4A shows a top view of a weighing device of a top module according to an embodiment;

FIG. 4B shows a perspective view of the weighing device shown in FIG. 4A;

FIG. 4C shows side view of the weighing device shown in FIG. 4A;

FIG. 6A shows a top module according to an embodiment mounted on a mobile robot;

FIG. 6B shows the top module shown in FIG. 6A carrying a pallet;

FIG. 7A shows a top view of a weighing device of a top module according to an embodiment;

FIG. 7B shows a perspective view of the weighing device shown in FIG. 7A;

FIG. 7C shows a cross-sectional close-up view of a weighing device of a top module according to an embodiment;

DETAILED DESCRIPTION

Figure 5A:
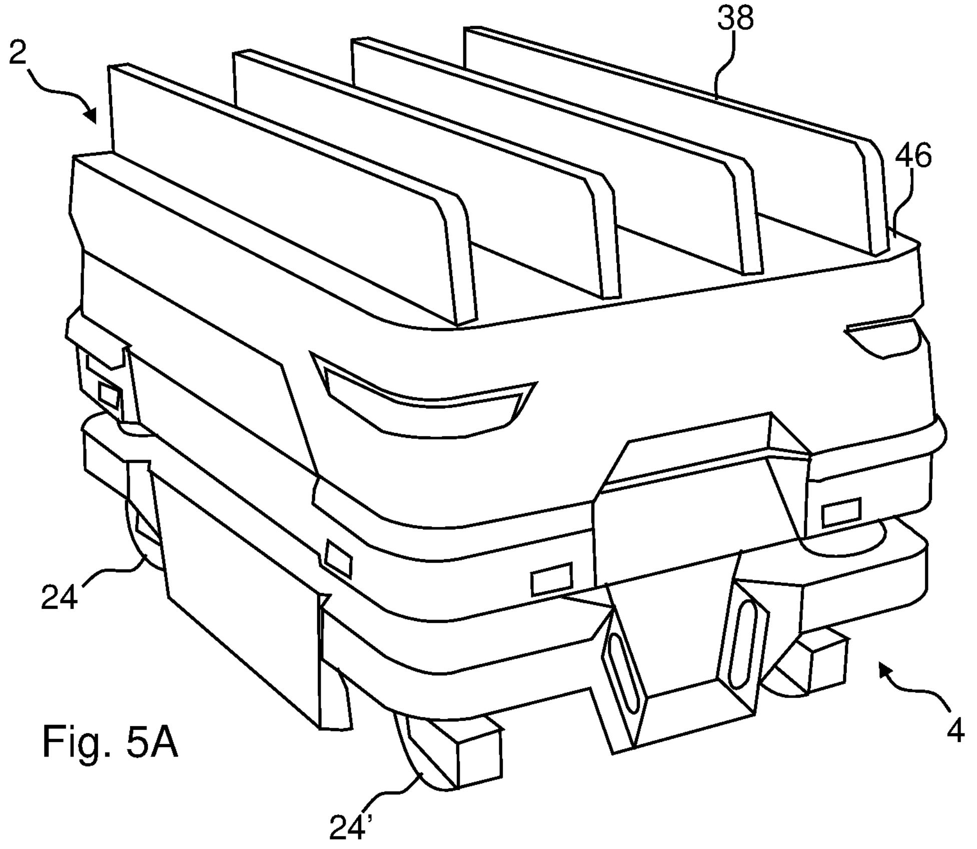
FIG. 5A shows a top module according to an embodiment mounted on a mobile robot.

FIG. 1A illustrates a side view of a top module 2 according to an embodiment mounted on a wheeled mobile robot 4. The top module 2 is mechanically and electronically connected to the mobile robot 4. The mobile robot 4 comprises ground-engaging wheels 24, 24'.

The top module 2 comprises a top surface configured to receive one or more objects 10. It can be seen that the top module 2 is carrying an object 10 that is placed on the top surface of the top module 2.

The top module 2 is configured to be placed on and be mechanically attached and electronically connected to the mobile robot 4. The top module 2 comprises several integrated weighing devices 6, 6' configured to detect the weight of the object 10 arranged on the top module 2.

Each weighing device 6, 6' is:

a) mechanically attached to the bottom portion of the top module 2 by first attachment elements (not shown); and b) mechanically attached to the top portion of the mobile robot 4 by second attachment elements (not shown).

FIG. 1B illustrates a bottom view of the top module 2 shown in FIG. 1A. The top module 2 comprises four weighing devices 6, 6', 6", 6"' attached to a rectangular bottom plate 22.

One weighing device 6, 6', 6", 6"' is arranged in each corner portion of the bottom portion of the top module 2. Each weighing device 6, 6', 6", 6"' comprises a plurality of holes 26 for attaching the weighing device 6, 6', 6", 6"' to the top module 2. Each weighing device 6, 6', 6", 6"' comprises a centrally arranged throughbore 32 designed for attaching the weighing device 6, 6', 6", 6"' to a mobile robot (see FIG. 2A, FIG. 2B and FIG. 3B). Each weighing device 6, 6', 6", 6"' comprises a housing formed as a portion of a cylindrical structure (having a circular cross section). A planar surface 28 is, however, provided by cutting away a portion of the circle. The planar surface 28 extends along the axial axis of the cylinder and perpendicular a radius of the circle. Accordingly, the planar surface 28 of the housing can be arranged close to a side portion of the top module.

FIG. 2A illustrates a schematic cross-sectional view of a top module 2 according to an embodiment arranged above a wheeled mobile robot 4. The mobile robot 4 comprises several ground engaging wheels 24, 24'. The top module 2 comprises a bottom surface 52 that typically is planar.

The top module 2 comprises several weighing devices 6, 6' each being mechanically attached to the top module 2. The attachment is typically established by screws extending through holes in each weighing device 6, 6', wherein said screws extend further into threaded holes provided in the bottom surface 52 of the top module 2. A screw (or bolt) 12 extends through a throughbore in each weighing device 6, 6'.

The mobile robot 4 is provided with mounting structures 14 formed as threaded holes arranged and configured to receive the corresponding screws 12. Accordingly, each screw 12 is arranged and configured to be screwed into the corresponding mounting structure (threaded hole) 14 in the mobile robot 4. A more detailed view can be seen in FIG. 3B.

FIG. 2B illustrates a schematic cross-sectional view of the top module shown in FIG. 2A attached to the mobile robot 4 shown in FIG. 2A. The screws 12 have been screwed into the threaded holes 14. Accordingly, the top module 2 is mechanically attached to the mobile robot 4.

FIG. 3A illustrates a bottom view of a top module 2 according to an embodiment. The top module 2 basically corresponds to the one shown in and explained with reference to FIG. 1B. The weighing devices 6, 6', 6", 6"' are, however, arranged a larger distance from the edges of the top module 2. It can be seen that there is a non-zero distance between the planar surface 28 and the adjacent parallel side portion of the top module 2.

FIG. 3B illustrates a cross-sectional close-up view of a weighing device 6 of a top module 2 according to an embodiment. The weighing device 6 comprises a slidably mounted portion 16 that surrounds a resilient or flexible member 18 that surrounds a fixed portion 20.

The fixed portion 20 is attached to the underlying mobile robot 4 by a screw 12 that is screwed into a threaded hole 14 provided in the top portion of the mobile robot 4. Optionally, a washer 36 is provided between the head of the screw 12 and the top portion of the fixed portion 20.

The top module 2 is provide with a cavity 8 configured to receive a central portion of the weighing device 6, which central portion protrudes from the uppermost part of the slidably mounted portion 16. It can be seen that the uppermost portion of the fixed portion 20 and the head portion of the screw 12 protrudes from the level of the uppermost part of the slidably mounted portion 16 into the cavity 8.

When an object is placed on the top of the top module 2, the top module 2 is displaced slightly downwards due to the resilience of flexibility of the resilient or flexible member 18. The degree of the displacement is determined by the weight of the object. In an embodiment, the weighing device 6 is formed as a strain gauge configured to measure electrical resistance due to changes in strain (deformation or displacement) of a portion of the weighing device 6.

It can be seen that the slidably mounted portion 16 is mounted a non-zero distance D above the uppermost surface of the mobile robot 4.

In an embodiment, the height difference between the top module 2 with the integrated weighing device 6 and the top module 2 without the integrated weighing device 6 is less than 2 cm. This can be accomplished by ensuring that the indicated height H is less than 2 cm.

FIG. 4A illustrates a top view of a weighing device 6 of a top module 6 according to an embodiment. The weighing device 6 basically corresponds to the one shown in and explained with reference to FIG. 3B. FIG. 4B illustrates a perspective view of the weighing device 6 shown in FIG. 4A.

It can be seen that the weighing device 6 comprises a housing shaped as a cylindrical body that has been cut along a plane extending perpendicular to a radius of the cylinder and along a plane extending parallel to the longitudinal axis X of the cylinder. The cut-away portion is indicated by a dotted line.

The weighing device 6 comprises a plurality of holes 26 for attaching the weighing device 6 to a top module (as shown in FIG. 3B). The weighing device 6 comprises a centrally arranged throughbore 32 designed for attaching the weighing device 6 to a mobile robot (see FIG. 2A, FIG. 2B and FIG. 3B).

The weighing device 6 comprises a slidably mounted portion 16 that surrounds a resilient or flexible member 18 surrounding a fixed portion 20. In an embodiment, the weighing device 6 comprises four holes 26 evenly distributed along the periphery of the slidably mounted portion 16.

The fixed portion 20 is configured to be attached to an underlying mobile robot 4 by using a screw that is screwed into a threaded hole provided in the top portion of the mobile robot as illustrated in FIG. 3B.

In FIG. 4C it can be seen that the fixed portion 20 is provided with a planar support surface 34 that protrudes from the lowermost surface of the slidably mounted portion 16. This means that when the planar support surface 34 rests on the mobile robot (as show in FIG. 3B), there will be a gap between the bottom side of the slidably mounted portion 16 and the mobile robot.

FIG. 5A illustrates a top module 2 according to an embodiment mounted on a mobile robot 4. The mobile robot 4 is equipped with four wheels 24, 24'. The top module 2 comprises an upper surface 46 and a plurality of ridges 38 protruding therefrom.

Figure 5B:
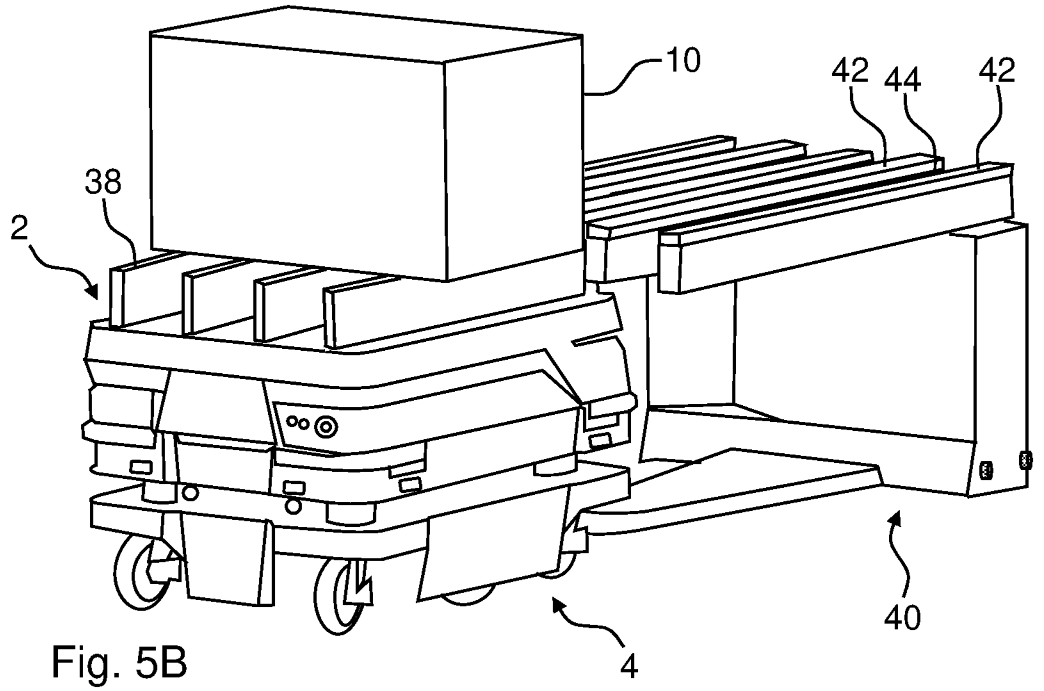
FIG. 5B shows the top module shown in FIG. 5A carrying a box.

FIG. 5B illustrates the top module 2 shown in FIG. 5A carrying a box 10. The top module 2 is placed next to a gate 40 having a plurality of spaced apart gate bars 42. A slot 44 is provided between the adjacent gate bars 42. The ridges 38 of the top module 2 are spaced from each other and adapted to be received by the slots 44.

FIG. 6A illustrates a top module 2 according to an embodiment mounted on a mobile robot 4.

FIG. 6B illustrates the top module 2 shown in FIG. 6A carrying a pallet 10. The top module 2 comprises two parallel spaced apart elongated contact structures 48 designed to be received by the longitudinal openings 50 of the pallet 10.

FIG. 7A illustrates a top view of a weighing device 6 of a top module according to an embodiment. FIG. 7B illustrates a perspective view of the weighing device 2 shown in FIG. 7A. The weighing device 6 basically corresponds to the one shown in and explained with reference to FIG. 4A and FIG. 4B. The slidably mounted portion 16, however, is cylindrical with a circular cross section since no portion has been cut away like in FIG. 4A and FIG. 4B.

FIG. 7C illustrates a cross-sectional close-up view of a weighing device 6 of a top module 2 according to an embodiment. The weighing device 6 comprises a slidably mounted portion 16 that surrounds a resilient or flexible member 18 that surrounds a fixed portion 20.

The fixed portion 20 is attached to the underlying mobile robot 4 by a screw 12 that is screwed into a threaded hole 14 provided in the top portion of the mobile robot 4. A washer 36 is typically provided between the head of the screw 12 and the top portion of the fixed portion 20.

The top module 2 does not comprise a cavity like the one shown in FIG. 3B. The uppermost portion of the fixed portion 20 and the head portion of the screw 12 does not protrude from the level of the uppermost part of the slidably mounted portion 16. On the contrary, the top portion of the slidably mounted portion 16 is provided at a higher level than the uppermost portion of the fixed portion 20 and the head portion of the screw 12. Therefore, no cavity is required in the lower portion of the top module 2.

When an object is placed on the top of the top module 2, the top module 2 is displaced slightly downwards due to the resilience of flexibility of the resilient or flexible member 18. The degree of the displacement is determined by the weight of the object. In an embodiment, the weighing device 6 is formed as a strain gauge configured to measure electrical resistance due to changes in strain (deformation or displacement) of a portion of the weighing device 6.

The slidably mounted portion 16 is mounted a non-zero distance D above the uppermost surface of the mobile robot 4.

In an embodiment, the height difference between the top module 2 with the integrated weighing device 6 and the top module 2 without the integrated weighing device 6 is less than 2 cm. This can be accomplished by ensuring that the indicated height H is less than 2 cm.

Figure 8A:
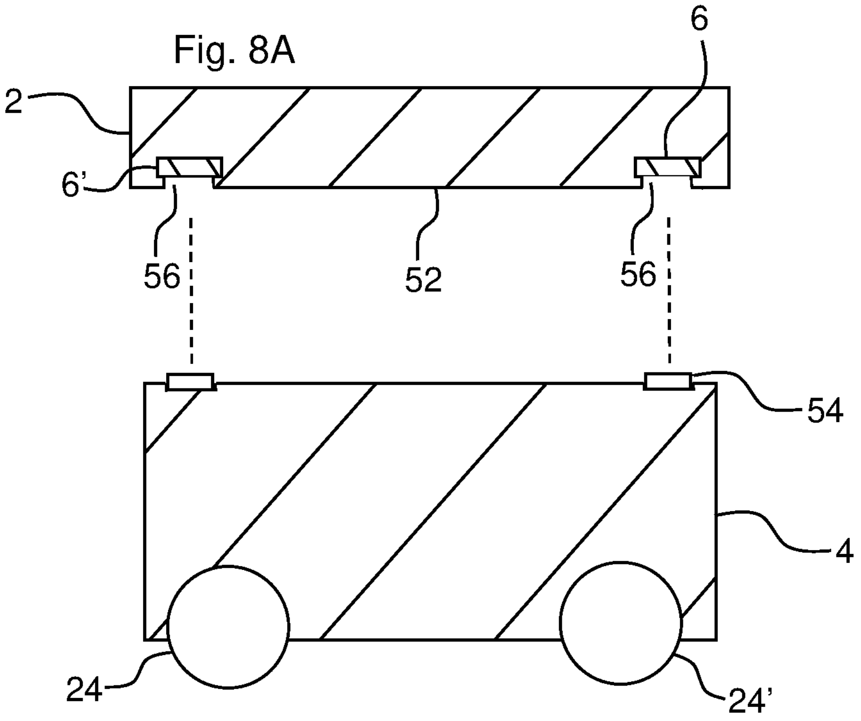
FIG. 8A shows a schematic cross-sectional view of a top module according to an embodiment arranged above a mobile robot.
Figure 8B:
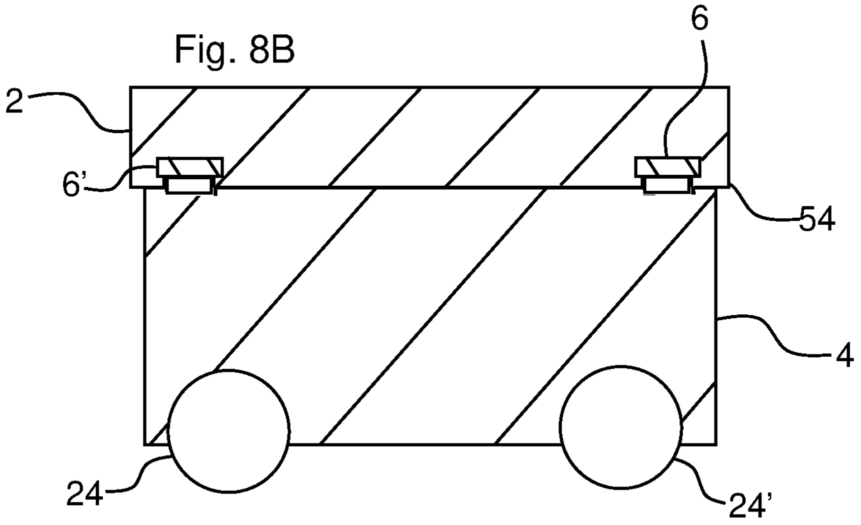
FIG. 8B shows a schematic cross-sectional view of a top module according to an embodiment attached to a mobile robot.

FIG. 8A illustrates a schematic cross-sectional view of a top module 2 according to an embodiment arranged above a mobile robot 4. FIG. 8B illustrates a schematic cross-sectional view of a top module 2 according to an embodiment attached to a mobile robot 4.

The top module 2 comprises several spaced apart integrated weighing devices 6, 6'. The integrated weighing devices 6, 6' are arranged above the bottom surface 52 of the top module 2. Accordingly an opening 56 is arranged below the integrated weighing devices 6, 6'.

The mobile robot 4 comprises a transfer structure 54 for each opening 56. As it can be seen in FIG. 8B, each transfer structure 54 is brought into contact with a bottom side of a corresponding weighing device 6, 6'. When an object is placed on the top module 2, the integrated weighing devices 6, 6' will be pressed towards the transfer structures 54 and the weighing devices 6, 6' will detect the weight of the object.

LIST OF REFERENCE NUMERALS

2 Top module
4 Mobile robot
6, 6', 6", 6'" Weighing device
8 Cavity
10 Object
12 Attachment structure
14 Mounting structure (e.g. a hole)
16 Slidably mounted portion
18 Resilient or flexible member
20 Fixed portion
22 Bottom plate
24, 24' Wheel
D Distance
26 Hole
28 Planar surface
30 Contact surface
32 Throughbore
34 Support surface
36 Washer
38 Ridge
40 Gate
42 Gate bar
44 Slot between adjacent gate bars
45 Upper surface
48 Contact structure
50 Opening
52 Bottom surface
54 Transfer structure
56 Opening
H Height
X Longitudinal axis

What is claimed is:

1. A top module configured to be placed on and be mechanically attached to and electronically connected to a mobile robot, said top module comprising:

attachment structures for attaching the top module to the mobile robot, wherein the top module comprises an integrated weighing device configured to detect a weight of an object arranged on the top module, wherein the weighing device comprises a plurality of spaced apart weighing units each having a fixed portion that is fixed to the mobile robot by a screw member extending through a bore provided in the fixed portion and a slidably mounted portion that is mounted a non-zero distance above the mobile robot.

2. The top module according to claim 1, wherein each of the weighing units comprises a strain gauge arranged in a mounting structure such that upon loading the top module the strain gauge is displaced relative to the mobile robot.

3. The top module according to claim 1, wherein each of the weighing units is attached by one of the attachment structures.

4. The top module according to claim 1, wherein a resilient member is provided between the fixed portion and the slidably mounted portion.

5. The top module according to claim 1, wherein a flexible member is provided between the fixed portion and the slidably mounted portion.

6. The top module according to claim 1, wherein the top module comprises a rectangular bottom plate and the weighing units are arranged in each corner portion of the bottom plate.

7. The top module according to claim 6, wherein the weighing unit comprises a strain gauge arranged in a mounting structure such that upon loading the top module the strain gauge is displaced relative to the mobile robot.

8. The top module according to claim 1, wherein a height difference between the top module with the integrated weighing device and the top module without the integrated weighing device is less than 2 cm.

9. A robot system comprising a mobile robot and a top module according to claim 1.

10. A method for weighing an object placed on a top module that is placed on and attached to a mobile robot, the top module comprising one or more attachment structures for attaching the top module to the mobile robot and an integrated weighing device configured to detect the weight of an object arranged on the top module, the weighing device comprising a plurality of spaced apart weighing units each having a fixed portion that is fixed to the mobile robot by a screw member extending through a bore provided in the fixed portion and a slidably mounted portion that is mounted a non-zero distance above the mobile robot, the method comprising:

arranging the object on the top module; and applying the integrated weighing device to detect the weight of the object.

11. The method according to claim 10, wherein each of the weighing units comprises a strain gauge arranged in a mounting structure such that upon loading the top module the strain gauge is displaced relative to the mobile robot.

12. The method according to claim 10, wherein each of the weighing units is attached by one of the attachment structures.

13. The method according to claim 10, wherein a flexible member is provided between the fixed portion and the slidably mounted portion.

14. The method according to claim 10, wherein the top module comprises a rectangular bottom plate and the weighing units are arranged in each corner portion of the bottom plate.

15. The method according to claim 14, wherein each of the weighing units comprises a strain gauge arranged in a mounting structure such that upon loading the top module the strain gauge is displaced relative to the mobile robot.

16. The method according to claim 10, wherein a height difference between the top module with the integrated weighing device and the top module without the integrated weighing device is less than 2 cm.

* * * * *